(12) United States Patent
Hennessy (10) Patent No.: US 10,371,538 B2
(45) Date of Patent: Aug. 6, 2019

(54) DETERMINING DIRECTIONS FOR USERS WITHIN A VENUE TO MEET IN THE VENUE

(71) Applicant: VenueNext, Inc., Santa Clara, CA (US)

(72) Inventor: Peter Mark Hennessy, Novato, CA (US)

(73) Assignee: VenueNext, Inc., Santa Clara, CA (US)

( * ) Notice: Subject to any disclaimer, the term of this patent is extended or adjusted under 35 U.S.C. 154(b) by 155 days.

(21) Appl. No.: 15/389,209

(22) Filed: Dec. 22, 2016

(65) Prior Publication Data

US 2018/0180425 A1   Jun. 28, 2018

(51) Int. Cl.
*G01C 21/34* (2006.01)
*G01C 21/20* (2006.01)
*G06Q 10/10* (2012.01)

(52) U.S. Cl.
CPC ....... *G01C 21/3438* (2013.01); *G01C 21/206* (2013.01); *G01C 21/3415* (2013.01); *G06Q 10/109* (2013.01)

(58) Field of Classification Search
CPC .................................................. G01C 21/3438
See application file for complete search history.

(56) References Cited

U.S. PATENT DOCUMENTS

| | | | | |
|---|---|---|---|---|
| 2012/0290950 A1* | 11/2012 | Rapaport | ................ | H04L 51/32 715/753 |
| 2013/0145288 A1* | 6/2013 | Zadeh | ..................... | H04W 4/21 715/753 |
| 2018/0027381 A1* | 1/2018 | Kamino | .................. | H04L 51/20 455/456.1 |

FOREIGN PATENT DOCUMENTS

WO   WO-2011055005 A1 *   5/2011   ......... G01C 21/3438

* cited by examiner

*Primary Examiner* — Mussa A Shaawat
*Assistant Examiner* — Abdhesh K Jha
(74) *Attorney, Agent, or Firm* — Fenwick & West LLP (57) ABSTRACT

An online system associated with a venue provides an application to client devices that allows a user to select an additional user from information accessible to a client device and to identify a meeting point within the venue for the user and the additional user to meet. The application identifies the additional user to an online system, which determines whether the additional user also uses the online system and is within a threshold distance of the venue. If the additional user is a user of the online system and is within the threshold distance of the venue, the online system transmits a request to travel to the meeting point to a client device associated with the additional user. The online system also provides directions to the user's client device and to the additional user's client device for the user and the additional user, respectively, to travel to the meeting point.

16 Claims, 4 Drawing Sheets

DETERMINING DIRECTIONS FOR USERS WITHIN A VENUE TO MEET IN THE VENUE

BACKGROUND

This invention relates generally to interaction with a venue, and more specifically to facilitating meetings between users in the venue.

Venues such as stadiums, convention centers, amphitheaters, or other locations where people congregate frequently host events that large numbers of users attend. These users compensate the venue in exchange for attending the venue during an event, providing revenue to the venue. When attending a venue, users may wish to meet with other users at the venue, which may increase the amount of time the users spend at the venue or increase the frequency with which the users attend the venue.

However, as different users may have different familiarity with the layout of the venue, it can be difficult for users to coordinate a location within the venue where to meet. Such coordination may involve planning prior to users arriving at the venue or communication while the users are at the venue to be successful. Advance planning may be difficult for users in various circumstances, and communication while at the venue may be difficult depending on the even occurring at the venue while users are attending the venue. This may prevent a user from inviting additional users to meet at the venue or may cause users to spend less time in a venue so they can more easily meet to interact with each other in another location.

SUMMARY

A venue is a geographic location, such as a geographic location associated with one or more structures. Examples of a venue include a stadium, a convention center, an arena, a theater, an amphitheater, or other suitable structure or location where people may gather for an event. In various embodiments, users obtain a ticket to enter the venue, and various events are performed at the venue. Additionally, one or more vendors are associated with the venue and provide goods or services to users attending the venue. Examples of vendors include restaurants, food service providers, beverage providers, merchandise retailers, or other suitable entities providing products or services.

To improve user interaction with the venue, an online system is associated with the venue and maintains information associated with users and with vendors associated with the venue. For example, the online system maintains user profiles associated with users of the online system that include demographic information, preferences, or other information about the users. The online system communicates information about the venue or about events occurring at the venue to client devices associated with users of the online system. Additionally, the online system may receive orders for products or services from users and communicates the received orders to vendors associated with the venue to be fulfilled.

Additionally, the online system provides an application associated with the online system to various client devices, allowing users for whom the online system maintains user profiles to access content maintained provided by the online system or to perform actions via the online system. For example, a user of the online system provides data to the application associated with the online system executing on a client device, which communicates the data to the online system. Based on the provided data, the online system performs one or more actions.

The online system facilitates users meeting with each other within the venue via the application associated with the online system executing on client devices to improve user engagement with the venue. To allow users to more easily physically meet with each other while at the venue, a client device associated with a user of the online system executes the application associated with the online system. Subject to user-specified privacy settings, the application is capable of accessing information locally stored on the client device. If authorized by the user, the application retrieves information stored on the client device identifying additional users. For example, the user authorizes the application to access a contact listing or an address book stored on the client device, so the client device retrieves information from the contact listing or from the address book identifying additional users. In some embodiments, the client device includes information for accessing a user profile on a third party system for the user and the user authorizes the application to access certain information in the user profile on the third party system, so the application retrieves the certain information in the user profile from the third party system. For example, the user profile on the third party system includes a contact list or information identifying other users connected to the user via the third party system, and the application retrieves information identifying users on the contact list or the other users connected to the user via the third party system from the user profile if authorized by the user.

The application presents information identifying the additional users from the retrieved information to the user via the client device. For example, the application presents a name or other identifying information for various users identified by the retrieved information. From the information identifying the additional users, the application receives a selection of an additional user from the user. For example, the application receives a selection of an additional user when the user accesses a name or other identifying information of the additional user presented by the application. The information identifying the additional users presented by the application does not indicate whether the additional users have user profiles maintained by the online system or whether physical locations of the additional users are proximate to a physical location of the venue. Rather, the application presents information identifying additional users based on information from the client device identifying additional users or information maintained by a third party system for the user that identifies additional users.

Additionally, the selection of the additional user received by the application identifies a physical location of a meeting point for the user and the selected additional user to physically meet. The physical location of the meeting point is a physical location within the venue, and may be geographical coordinates or an identifier of a region or a portion of a region within the venue (e.g., a vendor in a particular region of the venue, an identifier of a row and/or a seat in a region of the venue). In some embodiments, the physical location of the meeting point may be a physical location within a threshold distance of a physical location of the venue. In some embodiments, the selection also identifies a time associated with the meeting point, allowing the user to specify a time for the user and the selected additional user to physically meet at the physical location of the meeting point.

The online system receives information identifying the selected additional user and the physical location of the meeting point from the client device associated with the user. For example, online system receives information identifying the selected additional user (e.g., a name, an e-mail address, a telephone number, a username associated with the user by a third party system, etc.) and the physical location of the meeting point. Because the information identifying the additional users presented by the application executing on the client device was retrieved from the client device or from a third party system, the information from which the user selected the additional user does not indicate whether the additional users are associated with physical locations within a threshold distance of the venue or whether the additional users are using client devices that execute the application associated with the online system. Accordingly, from the received information identifying the selected additional user and the physical location of the meeting point, the online system determines whether the online system maintains a user profile for the selected additional user. For example, the online system compares information identifying the selected additional user with information included in user profiles maintained by the online system and determines the online system maintains a user profile for the selected additional user if information in at least one user profile maintained by the online system matches the received information identifying the selected additional user.

If the online system determines that a user profile maintained by the online system includes information matching the received information identifying the selected additional user, the online system determines if an additional client device associated with the selected additional user is executing the application associated with the online system. In various embodiments, the user profile maintained by the online system for the selected additional user includes information indicating whether an additional client device associated with the selected additional user has installed the application associated with the online system. For example, the user profile for the selected additional user includes a device identifier of an additional client device on which the application is executing or includes a value indicating the selected additional user has installed the application on an additional client device.

Responsive to determining the online system maintains a user profile associated with the selected additional user and determining an additional client device associated with the selected additional user is executing the application associated with the online system, the online system determines whether a physical location of the additional client device associated with the selected additional user that is executing the application is within a threshold distance of a physical location of the venue. In some embodiments, the threshold distance of the physical location of the venue is based on information in the user profile for the user maintained by the online system, allowing different users to specify different threshold distances of the physical location of the venue. For example, the information identifying the selected additional user and the physical location of the meeting point received by the online system also includes an identifier associated with the user by the online system, which retrieves a user profile maintained for the user and obtains a threshold distance of the physical location of the venue from the retrieved user profile. Alternatively, the online system maintains a particular threshold distance from the physical location of the venue. In other embodiments, the online system determines the threshold distance from the physical location of the venue based on characteristics of the venue.

In response to also determining the physical location of the additional client device is less within the threshold distance of the physical location of the venue, the online system transmits a request including the physical location of the meeting point to the additional client device via a network. The online system may transmit the request using any suitable format or communication channel. In some embodiments, the request includes the physical location of the meeting point, while in other embodiments, the request includes more general information prompting the selected additional user to travel to the meeting point. The request may include a time for the selected additional user to arrive at the physical location of the meeting point if the online system received the time along with the information identifying the selected additional user and identifying the physical location of the meeting point. In some embodiments, the online system stores the request for a specified length of time if the online system determines the physical location of the additional client device is greater than the threshold distance of the physical location of the venue and later transmit the request if the online system subsequently determines a changed physical location of the additional client device is within the threshold distance of the physical location of the venue.

If the selected additional user accepts the request, the additional client device transmits an acceptance of the request to the online system via a network. For example, the application associated with the online system executing on the additional client device transmits the acceptance of the request to the online system. Based on the physical location of the client device, the online system determines directions from a physical location of the client device to the physical location of the meeting point. Similarly, the online system determines directions from a physical location of the additional client device to the physical location of the meeting point. In some embodiments, the online system determines the directions from the physical location of the client device to the physical location of the meeting point and determines the directions from the physical location of the additional client device to the physical location of the meeting point in response to receiving the acceptance of the request from the additional client device.

In various embodiments, the online system determines directions to the physical location of the meeting point based on physical locations of the client device and of the additional client device the online system most recently obtained or obtained within a threshold amount of time from a time when the online system begins determining the directions. When determining directions from the physical locations of the client device and of the additional client device to the physical location of the meeting point, the online system may retrieve plans, blueprints, or other information describing layout of the venue. In some embodiments, the online system determines directions that minimize a time for the user associated with the client device and for the selected additional user associated with the additional client device to reach the physical location of the meeting point. Alternatively, the online system determines directions that minimize distances travelled by the user associated with the client device by the selected additional user associated with the additional client device to reach the physical location of the meeting point. The online system may modify whether directions are determined to minimize the distance travelled or the time to reach the physical location associated with the meeting point based on settings included in user profiles for the user and for the selected additional user. For example, the user includes a setting in its user profile on the online system that causes the online system to determine directions from the physical location of the client device to the physical location of the meeting point that minimize the distance the user travels. As another example, the selected additional user includes a setting in its user profile on the online system that causes the online system to determine directions from the physical location of the client device 210A to the physical location that minimize the amount of time for the selected additional user to reach the physical location of the meeting point.

Additionally, the online system accounts for conditions in the venue when determining the directions. For example, the online system receives physical locations of other client devices executing the application associated with the venue and determines a number of users in various regions of the venue based on the physical locations of the other client devices. Based on the determined number of users, the online system determines directions that avoid regions, or other areas of the venue, having greater than a threshold number of users or having greater than a threshold density of users. Similarly, the online system may determine movement of users throughout the venue based on changes in physical locations of various client devices associated with users and determine directions that account for movement patterns of various users to allow the user and the selected additional user to more efficiently navigate through the venue to the physical location of the meeting point.

The online system transmits an interface to the client device that identifies the physical location of the meeting point, the physical location of the client device associated with the user, and the directions from the physical location of the client device to the physical location of the meeting point. Similarly, the online system transmits an interface to the additional client device that identifies the physical location of the meeting point, the physical location of the additional client device, and the directions from the physical location of the additional client device to the physical location of the meeting point. For example, the interface transmitted to the client device is a map of one or more regions of the venue with the physical location of the client device and the physical location of the meeting point overlaid on the map. Similarly, the interface transmitted to the additional client device is a map of one or more regions of the venue with the physical location of the additional client device and the physical location of the meeting point overlaid on the map. In the preceding examples, a visual representation of a path between the physical location of the client device or the physical location of the additional client device and the physical location of the meeting point is also overlaid on the map of the one or more regions of the venue. The directions may be identified in any suitable format or formats in various embodiments. Multiple formats may be used to identify the directions in some embodiments. For example, a path between the physical location of the client device and the physical location of the meeting pint is overlaid on a map of one or more regions of the venue, and text or audio data providing turn-by-turn directions for the user (or the selected additional user) to navigate from the physical location of the client device to the physical location of the meeting point.

If the online system identifies a change in the physical location of the client device associated with the user or in the physical location of the additional client device associated with the selected additional user, the online system determines modified directions from the changed physical location of the client device or from the changed physical location of the additional client device to the physical location of the meeting point. The online system transmits modifications to the interface or a modified interface including the modified directions or transmits modifications to the interface or a modified interface including the modified directions to the additional client device. For example, the online system generates modified directions when the physical location of the client device changes more than a threshold amount and transmits a modified interface including the modified directions to the client device. Similarly, the online system may generate modified directions when the physical location of the additional client device changes more than the threshold amount and transmit a modified interface including the modified directions to the additional client device. Hence, as the physical location of the client device or of the additional client device changes, the interface transmitted to the client device or to the additional client device is modified to account for the changed physical location of the client device or of the additional client device and to present modified directions that allow the user or the selected additional user, respectively, to navigate to the physical location of the meeting point.

The figures depict various embodiments for purposes of illustration only. One skilled in the art will readily recognize from the following discussion that alternative embodiments of the structures and methods illustrated herein may be employed without departing from the principles of described herein.

DETAILED DESCRIPTION

Venue Overview

Figure 1:
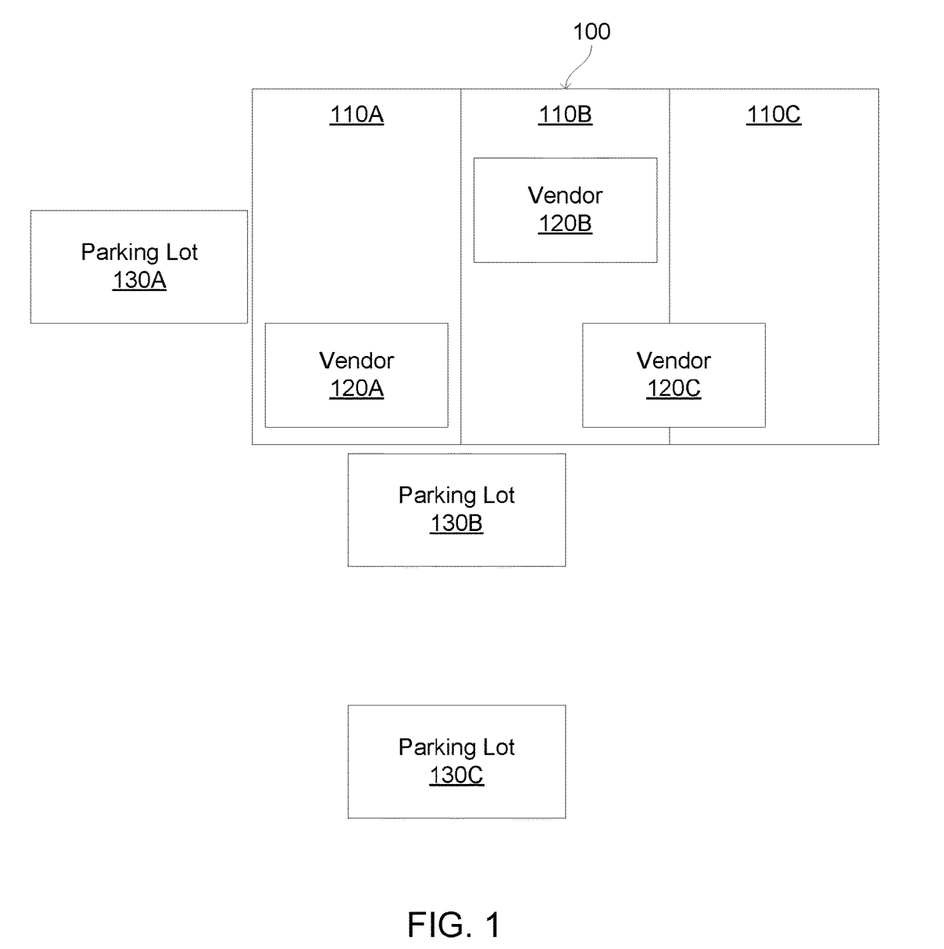
FIG. 1 is a block diagram of a venue, in accordance with an embodiment.

FIG. 1 is a block diagram of one embodiment of a venue 100. In the example of FIG. 1, the venue includes multiple regions 110A, 110B, 110C (also referred to individually and collectively using reference number 110). Additionally, one or more vendors 120A, 120B, 120C (also referred to individually and collectively using reference number 120) are included in the venue 100, and one or more parking lots 130A, 130B, 130C (also referred to individually and collectively using reference number 130) are associated with the venue 100. However, in other embodiments, different and/or additional components may be associated with or included in the venue 100.

The venue 100 is a geographic location, such as a geographic location associated with one or more structures. Examples of a venue 100 include a stadium, a convention center, an arena, a theater, an amphitheater, or other suitable structure. One or more regions 110 are included in the venue 100, with each region 110 corresponding to an area within the venue 100. For example, different regions 110 correspond to different sections of a stadium, different aisles of a stadium or arena, different rooms in a convention center, or any other suitable area within the venue 100. In some embodiments, an area within the venue 100 is associated with multiple regions 110 having different levels of precision. For example, a specific seat in a venue 100 is associated with a region 110 identifying a section including the seat, another region 110 identifying an aisle within the section including the seat, and an additional region identifying the specific seat. While FIG. 1 shows an example venue 100 including three regions 110A, 110B, 110C, in other embodiments, a venue 110 may include any number of regions 110.

One or more vendors 120 are included in the venue 110, with each vendor providing products or services to users within the venue 110. Examples of vendors 120 include restaurants, food service providers, beverage providers, merchandise retailers, or other suitable entities providing products or services. Different vendors 120 may be associated with different regions 110 of the venue. For example, a vendor 120A is associated with a region 110A, while a different vendor 120B is associated with a different region 110B. A vendor 110 may be associated with multiple regions 110; for example, a vendor 110C is associated with a region 110B as well as with an additional region 110C. In some embodiments, a vendor 120 is associated with a region 110 based on a distance between the vendor 120 and the region 110. For example, the vendor 120 is associated with a region 110 having a minimum distance from a location associated with the vendor 120. If a location associated with a vendor 120 is within a region 110, the vendor 120 is associated with the region 110 including the vendor's associated location.

Additionally, one or more parking lots 130A, 130B, 130C are associated with the venue 110 and identify physical locations for parking vehicles. Each parking lot includes one or more spaces, each space for parking a vehicle. A price is associated with each parking lot 130 specifying an amount of compensation a user provides to an entity associated with the venue 110 for a space in the parking lot 130 to be allocated for parking a vehicle associated with the user. Different parking lots 130 may have different distances from the venue 110, and prices associated with different parking lots 130 may be inversely proportional to a distance between a parking lot 130 and the venue 110. Each parking lot 130 is also associated with a capacity specifying a maximum number of vehicles that may be parked in a parking lot 130. The capacity may be total number of spaces in the parking lot 130 or may be a maximum number of vehicles. Information may be maintained by one or more devices included in a parking lot 130 specifying a number of spaces in the parking lot 130 in which vehicles are parked, specifying a number of vehicles within a geographic area associated with the parking lot 130, or any other suitable information. For example, a device included in the parking lot 130 increments a counter when a vehicle enters the geographic area associated with the parking lot 130 or when a vehicle is parked in a space of the parking lot 130.

System Architecture

Figure 2:
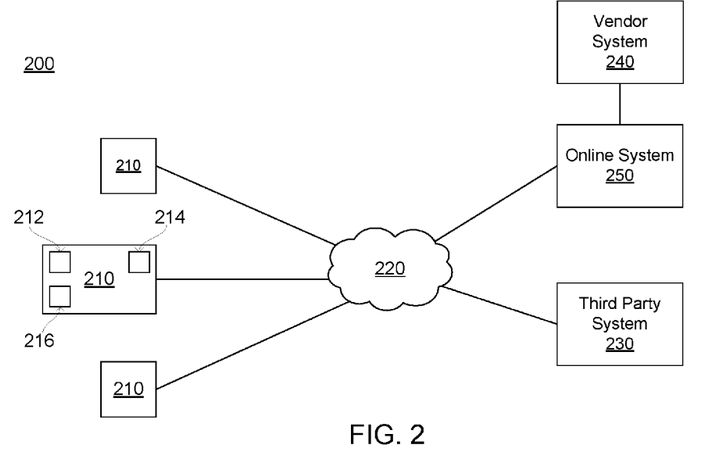
FIG. 2 is a block diagram of a system environment including an online system, in accordance with an embodiment.

FIG. 2 is a block diagram of a system environment 200 for an online system 250. The system environment 200 shown by FIG. 1 includes various client devices 210, a network 220, a third party system 230, one or more vendor systems 240, and an online system 250. In alternative configurations, different and/or additional components may be included in the system environment 200. The embodiments described herein may be adapted to online systems other than venue management systems.

A client device 210 is one or more computing devices capable of receiving user input as well as transmitting and/or receiving data via the network 220. In one embodiment, the client device 210 is a conventional computer system, such as a desktop computer or a laptop computer. Alternatively, the client device 210 may be a device having computer functionality, such as a personal digital assistant (PDA), a mobile telephone, a smartphone or another suitable device. A client device 210 is configured to communicate with other devices via the network 220. In one embodiment, the client device 210 executes an application allowing a user of the client device 210 to interact with the online system 250. For example, the client device 210 executes a browser application to enable interaction with the online system 250 or with one or more third party system 230 via the network 220. In another embodiment, a client device 210 interacts with the online system 250 through an application programming interface (API) running on a native operating system of the client device 210, such as IOS® or ANDROID™.

A display device 212 included in a client device 210 presents content items to a user of the client device 210. Examples of the display device 212 include a liquid crystal display (LCD), an organic light emitting diode (OLED) display, an active matrix liquid crystal display (AMLCD), or any other suitable device. Different client devices 210 may have display devices 212 with different characteristics. For example, different client devices 212 have display devices 212 with different display areas, different resolutions, or differences in other characteristics.

One or more input devices 214 included in a client device 210 receive input from the user. Different input devices 214 may be included in the client device 210. For example, the client device 210 includes a touch-sensitive display for receiving input data, commands, or information from a user. Using a touch-sensitive display allows the client device 210 to combine the display device 212 and an input device 214, simplifying user interaction with presented content items. In other embodiments, the client device 210 may include a keyboard, a trackpad, a mouse, or any other device capable of receiving input from a user. Additionally, the client device may include multiple input devices 214 in some embodiments. Inputs received via the input device 214 may be processed by an application associated with the online system 250 and executing on the client device 210 to allow a client device user to exchange information with the online system 250.

Additionally, a client device 210 may include one or more position sensors 216, which determine a physical location associated with the client device 210. For example, a position sensor 216 is a global positioning system (GPS) sensor that determines a physical location associated with the client device 210 based on information obtained from GPS satellites communicating with the GPS sensor, such as coordinates specifying a latitude and longitude of the location associated with the client device 210. As another example, a position sensor 216 determines a location associated with the client device 210 based on intensities of signals received from one or more access points (e.g., wireless access points) by the client device 110. In the preceding example, the position sensor 216 determines a location associated with the client device 210 based on signal intensity between the client device 210 and one or more wireless access points and service set identifiers (SSIDs) or media access control (MAC) addresses of the wireless access points. However, the client device 210 may include any suitable type of position sensor 216. In various embodiments, the client device 210 may include multiple position sensors 216.

The network 220 may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 130 may be coupled to the network 220 for communicating with one or more client devices 110 or with the online system 250. In one embodiment, a third party system 230 is an application provider communicating information describing applications for execution by a client device 210 or communicating data to client devices 110 for use by an application executing on the client device 210. In other embodiments, a third party system 230 provides content or other information for presentation via a client device 210. For example, a third party system 230 provides content related to an event occurring at the venue 110 to a client device 210 for presentation to a user; as an example, the third party system 230 provides video or audio data of a portion of an event occurring at the venue to a client device 210, allowing a user associated with the client device 210 to view the portion of the event from an alternative vantage point than the user's vantage point or to hear commentary about the portion of the event. As another example, a third party system 230 is a social networking system maintaining connections between various users and providing content for presentation to users based at least in part on the maintained connections. A third party system 230 may also communicate information to the online system 250, which subsequently communicates the information, or a portion of the information, to one or more client devices 110 via the network 220.

Additionally, one or more vendor systems 240 are coupled to the online system 250 via the network 220 or through direct connections between the vendor systems 240 and the vendor management system 150. A vendor system 240 is associated with a vendor 120 and receives orders for products or services from the online system 250 and provides the products or services identified by the orders. Further, a vendor system 240 provides the online system 250 with information describing fulfillment of orders by a vendor 120 associated with the vendor system 240. For example, the vendor system 240 provides information to the online system 250 specifying an estimated time to fulfill subsequently received or pending orders for products or services, an average time in which previously received orders were fulfilled, a number of unfulfilled orders received by the vendor system 240, or other suitable information. Information provided from the vendor system 240 to the vendor management system 150 accounts for orders received via the vendor management system 150 as well as orders received by the vendor 120 associated with the vendor system 240 from users visiting a location associated with the vendor 120.

Additionally, a vendor system 240 may provide information to the online system 250 describing products or services sold by a vendor 120 associated with the vendor system 240. For example, the vendor system 240 identifies a number of different products or services sold by the vendor 120 or identifies an amount of revenue received by the vendor 120 in exchange for different products or services. Information describing sold products or services may be communicated from the vendor system 240 to the online system 250 as the products or services are sold or may be communicated from the vendor system to the online system 250 at periodic intervals. Additionally, the online system 250 may request information describing sales of products or services to a vendor system 240, which provides the requested information to the online system 250 in response to receiving the request.

The online system 250, which is further described below in conjunction with FIG. 3, receives content from one or more third party systems 230 or generates content and provides content to users via an application associated with the online system 250 and executing on client devices 210. Additionally, the online system 250 maintains information associated with one or more parking lots 130 associated with a venue 100, such as a number of spaces in a parking lot 130 currently occupied, a price associated with a the parking lot 130, or a number of spaces in the parking lot 130 that have been purchased, as well as directions for navigating to a location associated with the parking lot 130. The online system 250 may communicate certain information associated with a parking lot 130 to one or more users, such as the price associated with the parking lot 130 or directions to the location associated with the parking lot 130. Associations between one or more vendors 120 and regions 110 of the venue 100 are also included in the online system 250, which also receives orders for products or services from one or more users and communicates the orders to one or more vendors 120 for fulfillment.

Figure 3:
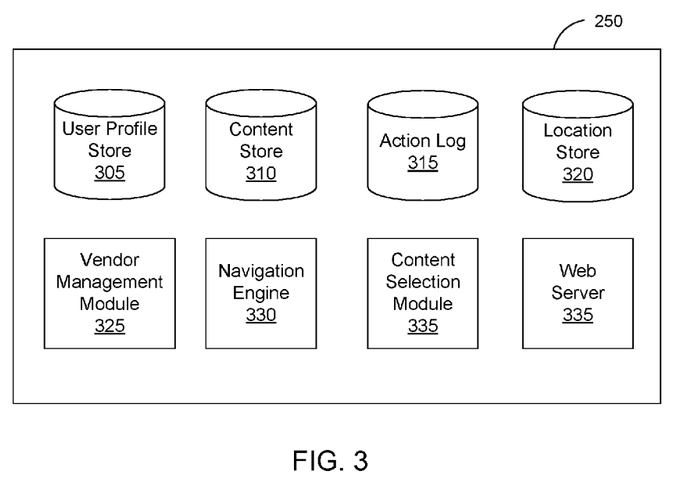
FIG. 3 is a block diagram of an online system management system, in accordance with an embodiment.

FIG. 3 is a block diagram of an architecture of an online system 250. The online system 250 shown in FIG. 3 includes a user profile store 305, a content store 310, an action log 315, a location store 320, a vendor management module 325, a navigation engine 330, a content selection module 335, and a web server 340. In other embodiments, the social networking system 130 may include additional, fewer, or different components for various applications. Conventional components such as network interfaces, security functions, load balancers, failover servers, management and network operations consoles, and the like are not shown so as to not obscure the details of the system architecture. In other embodiments, the online system 250 is any system providing content to users.

Each user of the online system 250 is associated with a user profile, which is stored in the user profile store 305. A user profile includes declarative information about the user provided by the user and may also include information inferred by the online system 250 from actions associated with the user or from other information. In one embodiment, a user profile includes multiple data fields, each describing one or more attributes of the corresponding user. Examples of information stored in a user profile include demographic information, contact information, preferences, and location information. For example, a user profile identifies a region 110 of the venue 100 associated with a user, such as a region 110 including a seat associated with a ticket to attend the venue 100 associated with the user. A user profile may also store other information provided by the user, for example, image data or video data. Additionally, a user profile in the user profile store 205 may also maintain references to actions by the corresponding user performed on content presented by the online system 250 or interactions between the corresponding user captured by one or more vendor systems 240 and communicated to the online system 250. For example, a user profile identifies prior orders for products or services the online system 250 received from a user and communicated to one or more vendor systems 150.

In some embodiments, a user profile includes a status associated with the user. The online system 250 may provide different functionality to a user based on the user's status. For example, the online system 250 communicates certain types of messages to client devices 210 associated with users having a specific type of status and does not communicate the certain types of messages to client devices 210 associated with users that do not have the specific type of status. As another example, the online system 250 presents less advertisement content to users having specific statuses. The status may be based on a frequency with which the user is associated with tickets to attend the venue 100 or an amount of money the online system 250 has received from the user (e.g., based on an amount the user has spent on tickets to attend the venue 100). Additionally, a user may provide an amount of compensation to the online system 250 for a specific status to be associated with the user. For example, the user provides the online system 250 with an amount of compensation per year or per month for the online system 250 to associate a specific status with the user.

The content store 310 stores objects that each represents various types of content received from one or more third party systems 230 or generated by the online system 250. Examples of content represented by an object include video data associated with an event occurring at the venue 100, image data associated with an event occurring at the venue 100, audio data associated with an event occurring at the venue 100, text data associated with an event occurring at the venue 100, information associated with the venue 100 or with the location of the venue 100, or other suitable. Additionally, content may be received from applications associated with a third party system 230 and executing on client devices 210 associated with users of the venue management system 230. In one embodiment, objects in the content store 210 represent single pieces of content, or content "items."

The action log 315 stores information describing actions performed by venue management system users internal to or external to the online system 250. For example, actions performed by a user on a third party system 230 that communicates information to the online system 250 are stored in the action log 315 along with information describing actions performed by the user through the online system 250. Examples of actions include: ordering a product or service from a vendor 120 included in the venue 100, checking-into the venue, accessing content provided by the online system 250 or provided by a third party system 230 that communicates with the online system 250, providing a review of a product, service, or vendor 120 to the online system 250 or to a third party system 230 that communicates with the vendor management system 250, providing a comment associated with the venue 100 or with an event occurring at the venue 100 to the online system 250 or to a third party system 230 that communicates with the online system 250. However, any suitable action may be stored in the action log 315 and associated with a user profile in the user profile store 305. Information in the action log 315 may identify the user performing an action, a type of the action, a description of the action, a time associated with the action, or any other suitable information. In some embodiments, data from the action log 315 is used to infer interests or preferences of a user, augmenting interests included in the user's user profile and allowing a more complete understanding of user preferences.

The action log 315 may also store user actions taken on a third party system 230, such as an external website, and communicated to the online system 250. For example, an e-commerce website may recognize a user of the online system 250 through a plug-in enabling the e-commerce website to identify the venue management system user. Because users of the online system 250 are uniquely identifiable, third party systems 230 may communicate information about a user's actions outside of the online system 250 to the online system 250 for association with the user. Hence, the action log 315 may record information about actions users perform on a third party system 230, such as purchases made, comments on content, or other information a user authorizes a third party system 230 to communicate to the vendor management system 250.

The location store 320 includes physical locations associated with various regions 110 of the venue 100. In various embodiments, the location store 320 includes a region identifier associated with each region 110 and information identifying a geographic area associated with the region identifier. Any suitable information may identify the geographic area associated with a region identifier. Example information identifying a geographic area of a region 110 include: physical coordinates specifying boundaries of a region 110 and an identifier of a portion of the venue 100 including the region 110. Additionally, the location store 320 includes data associating vendors 120 with one or more regions 110 of the venue 100. A vendor identifier uniquely associated with a vendor 120 is associated with a region identifier, with the association stored in the location store 320. Multiple vendors 120 may be associated with a region 110 of the venue 100.

In some embodiments, the location store 320 also associates location information with users of the online system 250. A client device 210 communicates location information to the online system 250, which may store the location information in the location store 320 or in the user profile store 305 in association with the user. Based on the received information, the online system 250 may determine a region 110 of the venue including the location information and associate the region identifier of the determined region with a user profile corresponding to the user. If the online system 250 receives modified location information from the client device 210, the venue management system 205 may modify the determined region 110 if a different region includes the modified location information. Alternatively, one or more sensors included in the venue 100 identify a client device 210 and determine a location associated with the client device 210. Based on the determined location, the online system 250 identifies a region 110 including the client device 110 and stores a region identifier of the region 110 in association with a user identifier of a user associated with the client device 210. In various embodiments, information identifying a location associated with the client device 210 (e.g., latitude and longitude) is also stored in the location store 320 in association with an identifier associated with the user associated with the client device 210. Additionally, the online system 250 may assign a location to a user and store the assigned location in association with the user in the location store 320. For example, when a user purchases a ticket to enter the venue 100, the ticket is associated with a location assigned to the user, and the location store 320 includes information associating the location assigned to the user from the ticket with an identifier associated with the user.

The vendor management module 325 receives orders for products (i.e., goods or services) from client devices 210 associated with users and communicates the orders to one or more vendor systems 240 of vendors 120 associated with the venue 100. In various embodiments, the vendor management module 325 includes vendor profiles each associated with one or more vendors 120 associated with the venue 100. A vendor profile includes a vendor identifier uniquely identifying a vendor 120 and additional information associated with the vendor 120, such as one or more regions 110 of the venue 100 associated with the vendor 120 and information for communicating with a vendor system 240 associated with the vendor 120. Further examples of information associated with the vendor 120 and included in a vendor profile include: contact information, hours of operation, a listing of goods or services provided by the vendor 120, a current inventory or products maintained by the vendor 120, and a current time for the vendor 120 to fulfill received orders. However, in other embodiments, additional or different information may be included in the vendor profile. One or more users authorized by the online system 250 may communicate information to the vendor management module 325 to modify regions 110 of the venue associated with one or more vendors 120.

When the vendor management module 325 receives an order, or a request, identifying a product identifying a vendor 120 from a user, the vendor management system 325 communicates the order to a vendor system 240 corresponding to the identified vendor 120. In some embodiments, the vendor management module 325 may select a vendor to fulfill the order based on the product identified in the request. The vendor 120 may subsequently deliver the product identified by the order to the user or may communicate a notification to the user via the online system 250 when the order is fulfilled. To expedite delivery of products or services, the vendor management module 325 may associate different vendors 120 with different regions 110 or the venue 100 to reduce time for users to receive products or services delivered by vendors 120. The vendor management module 325 may modify regions 110 of the venue 100 associated with a vendor 120 by modifying identifiers of regions 110 included in a vendor profile of a vendor 120. In some embodiments, the vendor management module 325 modifies regions 110 associated with a vendor 120 based on a number or a frequency of orders received from users associated with different regions 110 as well as time to fulfill orders by different vendors 120, products or services offered by different vendors 120, and number of orders received by different vendors 120. When modifying regions 110 associated with a vendor 120 or vendors 120 associated with a region, the venue management system 325 may account for products provided by various vendors 120 so similar products are provided to users in a region 110 before and after modification of the vendors 120 associated with the region 110.

Additionally, the vendor management module 325 receives information from a vendor system 240 and communicates the information to one or more client devices 210 for presentation to users. For example, the vendor system 240 communicates a time to fulfill an order, an estimated time to fulfill an order, a number of previously received orders that have yet to be fulfilled, or other suitable information to the vendor management module 325, which provides at least a subset of the information to a client device 210 for presentation to a user. As another example, a vendor system 240 communicates a message to the vendor management module 325 including a user identifier, an order identifier (or a description of an order), and an indication that an order corresponding to the order identifier has been fulfilled by a vendor. The vendor management module 325 identifies a user corresponding to the user identifier from the user profile store 305 and communicates the message to a client device 210 associated with the user.

As vendors 120 may deliver products to users in various regions 110 of the venue 100 to fulfill orders received from various users, in some embodiments, the vendor management module 325 regulates communication of orders received from client devices 210 associated with users to vendor systems 240 associated with various vendors 120. When the vendor management module 325 receives an order for a product or service from a client device 210 associated with a user, the vendor management module 325 stores the received order in a queue for a specified time interval before communicating the order to a vendor system 240 corresponding to a vendor 120 identified by the order. If the vendor management system 325 receives additional orders from users having one or more characteristics matching or similar to the order stored in the queue and identifying the vendor 120 identified by the order while the order is stored in the queue, the vendor management module 325 generates a group including the additional orders and the order stored in the queue and communicates the group or orders to a vendor system 240 associated with the vendor 120 to be fulfilled. For example, the vendor management system 325 generates a group including additional orders associated with users having a location matching a location of a user associated with an order stored in the queue. As additional examples, the vendor management system 325 generates a group including orders identifying products or services matching or similar to a product or service specified by an order stored in the queue or generates a group including orders identifying products or services having times for fulfillment within a threshold value of a time for fulfillment of the order stored in the queue. Communicating a group of orders having one or more matching or similar characteristics to a vendor system 240 allows the vendor 120 associated with vendor system 240 to more efficiently fulfill orders from users.

To allow users of the online system 250 to more easily meet with each other in person while they are at or near the venue 100, the navigation engine 330 determines directions from physical locations of client devices 210 associated with users of the online system 250 to a physical location of a meeting point specified by one of the users. An application associated with the online system 250 executing on a client device 210 of a user of the online system 250 is authorized by the user to obtain information identifying additional users stored on the client device 210 or on one or more third party systems 230 that the user has authorized the application to access. The application presents information identifying the additional users to the user, but does not present information identifying additional users for whom the online system 250 maintains user profiles and does not present information identifying additional users associated with client devices 210 having physical locations within a threshold distance of a physical location of the venue 100.

The navigation engine 330 receives information identifying an additional user selected by the user and a physical location of a meeting point via the application and determines whether the user profile store 305 includes a user profile having information matching the received information identifying the selected additional user, as further described below in conjunction with FIG. 4. In response to determining the user profile store 305 includes a user profile having information matching the received information identifying the selected additional user, the navigation engine 330 also determines whether the selected additional user is executing the application associated with the online system 250 on an additional client device 210 associated with the selected additional user, as further described below in conjunction with FIG. 4. Responsive to determining the additional client device 210 is executing the application associated with the online system 250, the navigation engine also determines whether a physical location of the additional client device 210 is within a threshold distance of the venue 100, as further described below in conjunction with FIG. 4. If the physical location of the additional client device 210 is within the threshold distance of the physical location of the venue 100, the navigation engine 330 transmits a request to travel to the meeting point to the additional client device 210, and transmits an interface to the additional client device 210 and to the client device 210 if the navigation engine receives an acceptance of the request from the additional client device 210.

The interface transmitted to the client device 210 includes directions determined by the navigation engine 330 from the physical location of the client device 210 to the physical location of the meeting point. Similarly, the navigation engine 330 transmits an interface to the additional client device including determined directions from the physical location of the additional client device 210 to the physical location of the meeting point. An interface includes the physical location of the meeting point, the determined directions, and the physical location of the client device 210 or the physical location of the additional client device 210, as further described below in conjunction with FIGS. 4 and 5. The interfaces allow the user and the selected additional user to more easily navigate through the venue to the physical location of the meeting point. In various embodiments, the navigation engine 330 modifies the directions and the interface if a physical location of the client device 210 or of the additional client device 210 changes. Additionally, when determining the directions, the navigation engine 330 may account for locations of other users in the venue 100 or movement of users throughout the venue to allow the user and the selected additional user to more quickly reach the physical location of the meeting point.

The content selection module 335 selects one or more content items for communication to a client device 210 for presentation to a user. Content items eligible for presentation to the user are retrieved from the content store 310, from a third party system 230, or from another source, by the content selection module 335, which selects one or more of the content items for presentation to the user. A content item eligible for presentation to the viewing user is a content item associated with at least a threshold number of targeting criteria satisfied by characteristics of the user or is a content item that is not associated with targeting criteria. For example, a content item associated with targeting criteria specifying a threshold distance of the venue 100 is identified as eligible for presentation to users associated with locations within a threshold distance of the venue 100. As another example, a content item associated with targeting criteria specifying attendance of an event at the venue 100 is identified as eligible for presentation to users attending the event or who have indicated they will attend the event. In various embodiments, the content selection module 335 includes content items eligible for presentation to the user in one or more selection processes, which identify a set of content items for presentation to the user. For example, the content selection module 335 determines a measure of relevance of various content items to a user based on characteristics associated with the user by the online system 250 based on actions associated with the user by the online system 250, characteristics of the user maintained by the online system 250, preferences of the user maintained by the online system 250, and characteristics of content items eligible for presentation to the user. For example, the content selection module 335 determines measures of relevance to a user based on characteristics of the content items, characteristics of the user, and actions associated with the user. Based on the measures of relevance, the content selection module 335 selects one or more content items for presentation to the user (e.g., content items having at least a threshold measure of relevance, content items having highest measures of relevance relative to other content items). In some embodiments, the content selection module 335 ranks content items based on their associated measures of relevance and selects content items having the highest positions in the ranking or having at least a threshold position in the ranking for presentation to the user.

A content item may be associated with bid amounts specifying an amount of compensation received by the online system 250 from a third party system 130 or from a user if one or more criteria associated with the content item are satisfied. For example, a bid amount associated with a content item specifies an amount of compensation received by the online system 250 when the content item is presented to a user or when a user presented with the content item performs a specified type of interaction with the content item. The content selection module 335 uses the bid amounts associated with various content items when selecting content for presentation to the user. In various embodiments, the content selection module 335 determines an expected value associated with various content items based on their bid amounts and selects content items associated with a maximum expected value or associated with at least a threshold expected value for presentation to the user. An expected value associated with a content item represents an expected amount of compensation to the online system 250 for presenting a content item. For example, the expected value associated with a content item is a product of the content item's bid amount and a likelihood of the user interacting with the content item. The content selection module 335 may rank content items associated with bid amounts separately than content items that are not associated with bid amounts and select content items for presentation based on the separate rankings (e.g., content items having at least a threshold position in a ranking)

The web server 340 links online system 250 via the network 220 to one or more client devices 210, as well as to one or more third party systems 230. Additionally, the web server 340 may exchange information between the online system 250 and one or more vendor systems 240. The web server 340 serves web pages, as well as other content, such as JAVA®, FLASH®, XML and so forth. The web server 340 may receive and route messages between the online system 250 and a client device 210, for example, instant messages, queued messages (e.g., email), text messages, short message service (SMS) messages, or messages sent using any other suitable messaging technique. A user may send a request to the web server 340 to upload information (e.g., images or videos) that are stored in the content store 210. Additionally, the web server 340 may provide application programming interface (API) functionality to send data directly to native client device operating systems, such as IOS®, ANDROID™, or BlackberryOS.

Determining Directions for Users of an Online System to Meet in a Venue

Figure 4:
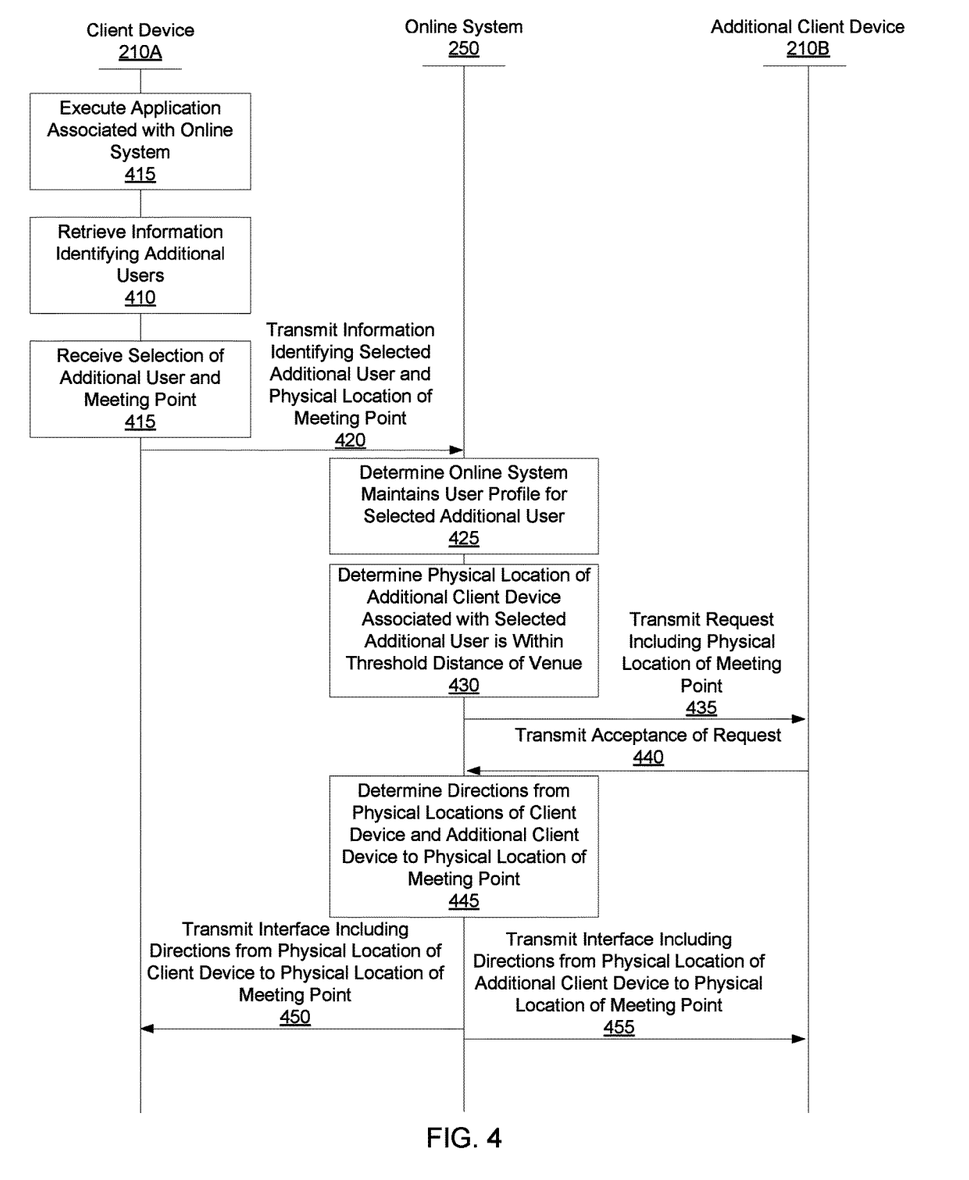
FIG. 4 is an interaction diagram of a method for determining directions for users of an online system to meet within a venue, in accordance with an embodiment.

FIG. 4 is an interaction diagram of one embodiment of a method for determining directions for users of an online system 250 to meet within a venue 100. In other embodiments, the method may include different and/or additional steps than those described in conjunction with FIG. 4. Additionally, in other embodiments, steps of the method may be performed in orders different than the order described in conjunction with FIG. 4.

An online system 250, such as a venue management system, associated with a venue 100 maintains user profiles for users of the online system 250. Accordingly, users for whom the online system 250 maintains a user profile are authorized to access functionality provided by the online system 250. Additionally, the online system 250 provides an application associated with the online system 250 to various client devices 210, allowing users for whom the online system 250 maintains user profiles to access content maintained provided by the online system 250 or to perform actions via the online system 250. For example, a user of the online system 250 provides data to the application associated with the online system 250 executing on a client device 210, which communicates the data to the online system 250. Based on the provided data, the online system 250 performs one or more actions.

The online system 250 facilitates users meeting with each other within the venue 100 via the application associated with the online system 250 executing on client devices 210 to improve user engagement with the venue. To simplify users personally interacting with each other within the venue 100, a user of the online system 250 executes 405 the application associated with the online system 250 on a client device 210A associated with the user. Subject to user-specified privacy settings, the application is capable of accessing information locally stored on the client device 210A. If authorized by the user, the application retrieves 410 information stored on the client device 210A identifying additional users. For example, the user authorizes the application to access a contact listing or an address book stored on the client device 210A, so the client device 210A retrieves 410 information from the contact listing or from the address book identifying additional users.

In some embodiments, the client device 210A includes information for accessing a user profile on a third party system 230 for the user and the user authorizes the application to access certain information in the user profile on the third party system 230, so the application retrieves the certain information in the user profile from the third party system 230. For example, the user profile on the third party system 230 includes a contact list or information identifying other users connected to the user via the third party system 230, and the application retrieves information identifying users on the contact list or the other users connected to the user via the third party system 230 from the user profile if authorized by the user. Privacy settings identifying information in a user profile on a third party system 230 accessible to the application may be stored in the application or stored in a user profile for the user maintained by the online system 250 that is accessible to the application.

The application presents information identifying the additional users from the retrieved information to the user via the client device 210A. For example, the application presents a name or other identifying information for various users identified by the retrieved information. From the information identifying the additional users, the application receives 415 a selection of an additional user from the user. For example, the application receives 415 a selection of an additional user when the user accesses a name or other identifying information of the additional user presented by the application. The information identifying the additional users presented by the application does not indicate whether the additional users have user profiles maintained by the online system 250 or whether physical locations of the additional user are proximate to a physical location of the venue 100. Rather, the application presents information identifying additional users based on information from the client device 210 identifying additional users or information maintained by a third party system 230 for the user that identifies additional users.

Additionally, the selection of the additional user received 415 by the application identifies a physical location of a meeting point for the user and the selected additional user to physically meet. The physical location of the meeting point is a physical location within the venue, and may be geographical coordinates or an identifier of a region 110 or a portion of a region 110 within the venue 100 (e.g., a vendor 120 in a particular region 110 of the venue 100, an identifier of a row and/or a seat in a region 110 of the venue). In some embodiments, the physical location of the meeting point may be a physical location within a threshold distance of a physical location of the venue 100. For example, the meeting point may be a physical location in a parking lot 130 associated with a vendor 120. Hence, the application allows the user to select an additional user and to identify a physical location in or within a threshold distance of the venue 100 for the user to meet the additional user, facilitating personal interaction between different users at the venue 100.

The application executing on the client device 210A associated with the user transmits 420 information identifying the selected additional user and the physical location of the meeting point to the online system 250. For example, the application transmits 420 information identifying the selected additional user (e.g., a name, an e-mail address, a telephone number, a username associated with the user by a third party system 130, etc.) and the physical location of the meeting point to the online system 250. However, because the information identifying the additional users presented by the application executing on the client device 210A was retrieved from the client device 210A or from a third party system 230, the presented information does not indicate whether additional users are associated with physical locations within a threshold distance of the venue 100 or whether the additional users are using client devices 210 that execute the application associated with the online system 250. Accordingly, after receiving the information identifying the selected additional user and the physical location of the meeting point, the online system 250 determines 425 whether the online system 250 maintains a user profile for the selected additional user. For example, the online system 250 compares information identifying the selected additional user with information included in user profiles maintained by the online system 250, and determines 250 the online system 250 maintains a user profile for the selected additional user if information in at least one user profile maintained by the online system 250 matches the received information identifying the selected additional user. Hence, if the received information identifying the selected additional user includes an identifier associated with the selected additional user matching an identifier included in a user profile maintained by the online system 250, the online system 250 determines 425 the online system 250 maintains a user profile for the selected additional user.

If the online system 250 determines 425 that no user profile maintained by the online system 250 includes user identifying information matching the received information identifying the selected additional user, the online system 250 performs no further action. In some embodiments, the online system 250 communicates a message to the application executing on the client device 210 to indicate the online system 250 is taking no further action. However, if the online system determines 425 that a user profile maintained by the online system 250 includes user identifying information matching the received information identifying the selected additional user, the online system 250 determines if an additional client device 210B associated with the selected additional user is executing the application associated with the online system 250. In various embodiments, the user profile maintained by the online system 250 for the selected additional user includes information indicating whether an additional client device 210B associated with the selected additional user has installed the application associated with the online system 250. For example, the user profile for the selected additional user includes a device identifier of an additional client device 210B on which the application is executing or includes a value indicating the selected additional user has installed the application on an additional client device 210B.

In some embodiments, if the online system 250 determines the application associated with the online system 250 is not executing on an additional client device 210B, the online system 250 communicates a notification to the selected additional user to install the application on a client device 210B associated with the user. For example, the online system 250 sends an e-mail, a text message, or another message to the selected additional user to install the application on one or more client devices 210B using an e-mail address, a telephone number, or other contact information included in the user profile maintained for the selected additional user by the online system 250. Alternatively, the online system 250 does not perform further action in response to determining the application associated with the online system 250 is not executing on an additional client device 210B associated with the selected additional user.

Responsive to determining 425 the online system 250 maintains a user profile associated with the selected additional user and to determining an additional client device 210B associated with the selected additional user is executing the application associated with the online system 250, the online system 250 determines whether a physical location of the additional client device 210B associated with the selected additional user that is executing the application is within a threshold distance of a physical location of the venue 100. In some embodiments, the threshold distance of the physical location of the venue 100 is based on information in the user profile for the user maintained by the online system 250, allowing different users to specify different threshold distances of the physical location of the venue 100. For example, the information identifying the selected additional user and the physical location of the meeting point received by the online system 250 also includes an identifier associated with the user by the online system 250, which retrieves a user profile maintained for the user and obtains a threshold distance of the physical location of the venue from the retrieved user profile. Alternatively, the online system 250 maintains a particular threshold distance from the physical location of the venue 100.

In other embodiments, the online system 250 determines the threshold distance from the physical location of the venue 100 based on characteristics of the venue. For example, the online system 250 increases the threshold distance from the physical location of the venue 100 if the online system 250 determines less than a threshold number of client devices 250 are in the venue 100 or decreases the threshold distance from the physical location of the venue 100 if the online system 250 determines greater than the threshold number of client devices 250 are in the venue. As another example, the online system 250 obtains information from one or more third party systems 230 describing conditions proximate to the venue 100 and determines the threshold distance from the physical location of the venue 100 based on the conditions proximate to the venue 100. For example, the online system 250 obtains traffic information for an area within a specific distance of the physical location of the venue 100 and determines the threshold distance from the physical location of the venue 100 based on the traffic information; the online system 250 may determine a smaller threshold distance from the physical location of the venue 100 in response to the traffic information indicating greater than a threshold level of congestion or may determine a larger threshold distance from the physical location of the venue 100 in response to the traffic information indicating less than the threshold level of congestion.

In response to also determining 430 the physical location of the additional client device 210B is less within the threshold distance of the physical location of the venue 100, the online system 250 transmits 435 a request including the physical location of the meeting point to the additional client device 210B via a network 120. The online system 250 may transmit 435 the request as a push notification communicated to the application associated with the online system 250 executing on the additional client device 210B. Alternatively, the online system 250 may transmit 435 the request as an e-mail, a text message, or using any other suitable communication channel. In some embodiments, the request includes the physical location of the meeting point, while in other embodiments, the request includes more general information prompting the selected additional user to travel to the meeting point. The request may include a time for the selected additional user to arrive at the physical location of the meeting point if the online system 250 received the time along with the information identifying the selected additional user and identifying the physical location of the meeting point. The online system 250 may store the request for a specified length of time if the online system 250 determines 430 the physical location of the additional client device 210B is greater than the threshold distance of the physical location of the venue 100 and later transmit the request 435 if the online system 250 subsequently determines 430 a changed physical location of the additional client device 210B is within the threshold distance of the physical location of the venue 100 in some embodiments. The specified length of time the request is stored may be based on a setting stored in the user profile of the user from whom information identifying the selected additional user was received or based on a parameter of the online system 250.

If the selected additional user accepts the request, the additional client device 210B transmits 440 an acceptance of the request to the online system 250 via a network 120. For example, the application associated with the online system 250 executing on the additional client device 210B transmits 440 the acceptance of the request to the online system 250. If the selected additional user declines the request, the additional client device 210B may transmit a message declining the request. Alternatively, the additional client device 210B does not transmit information to the online system 250 if the selected additional user declines the request.

Based on the physical location of the client device 210A, the online system 250 determines 445 directions from a physical location of the client device 210A to the physical location of the meeting point. Similarly, the online system 250 determines 445 directions from a physical location of the additional client device 210B to the physical location of the meeting point. In some embodiments, the online system 250 determines 445 the directions from the physical location of the client device 210A to the physical location of the meeting point and determines 445 the directions from the physical location of the additional client device 210B to the physical location of the meeting point in response to receiving the acceptance of the request from the additional client device 210B. In various embodiments, the online system 250 determines 445 directions to the physical location of the meeting point based on physical locations of the client device 210A and of the additional client device 210B the online system 250 most recently obtained or obtained within a threshold amount of time from a time when the online system 250 begins determining 445 the directions. When determining 445 directions from the physical locations of the client device 210A and of the additional client device 210B to the physical location of the meeting point, the online system 250 may retrieve plans, blueprints, or other information describing layout of the venue 100. In some embodiments, the online system 250 determines 445 directions that minimize a time for the user associated with the client device 210A and for the selected additional user associated with the additional client device 210B to reach the physical location of the meeting point. Alternatively, the online system 250 determines 445 directions that minimize distances travelled by the user associated with the client device 210A by the selected additional user associated with the additional client device 210B to reach the physical location of the meeting point. The online system 250 may modify whether directions are determined 445 to minimize the distance travelled or the time to reach the physical location associated with the meeting point based on settings included in user profiles for the user and for the selected additional user. For example, the user includes a setting in its user profile on the online system 250 that causes the online system 250 to determine 445 directions from the physical location of the client device 210A to the physical location of the meeting point that minimize the distance the user travels. As another example, the selected additional user includes a setting in its user profile on the online system 250 that causes the online system 250 to determine 445 directions from the physical location of the client device 210A to the physical location that minimize the amount of time for the selected additional user to reach the physical location of the meeting point.

Additionally, the online system 250 accounts for conditions in the venue 100 when determining 445 the directions. For example, the online system 250 receives physical locations of other client devices 210 executing the application associated with the venue 100 and determines a number of users in various regions 110 of the venue 100 based on the physical locations of the other client devices 210. Based on the determined number of users, the online system 250 determines 445 directions that avoid regions 110, or other areas of the venue 100, having greater than a threshold number of users or having greater than a threshold density of users. Similarly, the online system 250 may determine movement of users throughout the venue 100 based on changes in physical locations of various client devices 210 associated with users and determine 445 directions that account for movement patterns of various users to allow the user and the selected additional user to more efficiently navigate through the venue 100 to the physical location of the meeting point.

The online system 250 transmits 450 an interface to the client device 210A that identifies the physical location of the meeting point, the physical location of the client device 210A associated with the user, and the directions from the physical location of the client device 210A to the physical location of the meeting point. Similarly, the online system 250 transmits 455 an interface to the additional client device 210B that identifies the physical location of the meeting point, the physical location of the additional client device 210B, and the directions from the physical location of the additional client device 210B to the physical location of the meeting point. For example, the interface transmitted 450 to the client device 210A is a map of one or more regions 110 of the venue 100 with the physical location of the client device 210A and the physical location of the meeting point overlaid on the map. Similarly, the interface transmitted 455 to the additional client device 210B is a map of one or more regions 110 of the venue 100 with the physical location of the additional client device 210B and the physical location of the meeting point overlaid on the map. In the preceding examples, a visual representation of a path between the physical location of the client device 210A or the physical location of the additional client device 210B and the physical location of the meeting point is also overlaid on the map of the one or more regions 110 of the venue 100. The directions may be identified in any suitable format or formats in various embodiments. Multiple formats may be used to identify the directions in some embodiments. For example, a path between the physical location of the client device 210A (or the physical location of the additional client device 210B) and the physical location of the meeting pint is overlaid on a map of one or more regions 110 of the venue, and text or audio data providing turn-by-turn directions for the user (or the selected additional user) to navigate from the physical location of the client device 210A (or the physical location of the additional client device 210B) to the physical location of the meeting point.

In some embodiments, the online system 250 determines an estimated time to travel from the physical location of the client device 210A or from the physical location of the additional client device 210B to the physical location of the meeting point and includes the estimated time in the interface transmitted 450 to the client device 210A or to the additional client device 210B, respectively. When determining the estimated time (or estimated times), the online system 250 accounts for numbers of users in regions 110 or other portions of the venue 100 along a path from the physical location of the client device 210, or from the physical location of the additional client device 210B, to the physical location of the meeting point described by the directions or movements of users in the regions or the other portions of the venue 100 along the path from the physical location of the client device 210A or from the physical location of the additional client device 210B to the physical location of the meeting point described by the directions. The estimated time may be included in the generated interface transmitted 450 to the client device 210A or transmitted 455 to the additional client device 210B in various embodiments. Additionally, the online system 250 may include instructions in the interface 450 transmitted to the client device 210A or transmitted 455 to the additional client device 210A that, when executed, request updates to the estimated time at different intervals or that receive updates to the estimated time when the online system 250 modifies an estimated time based on changes to conditions in the venue 100 (e.g., changes in a number of users or changes in user movement along one or more portions of a path specified by the directions).

Figure 5:
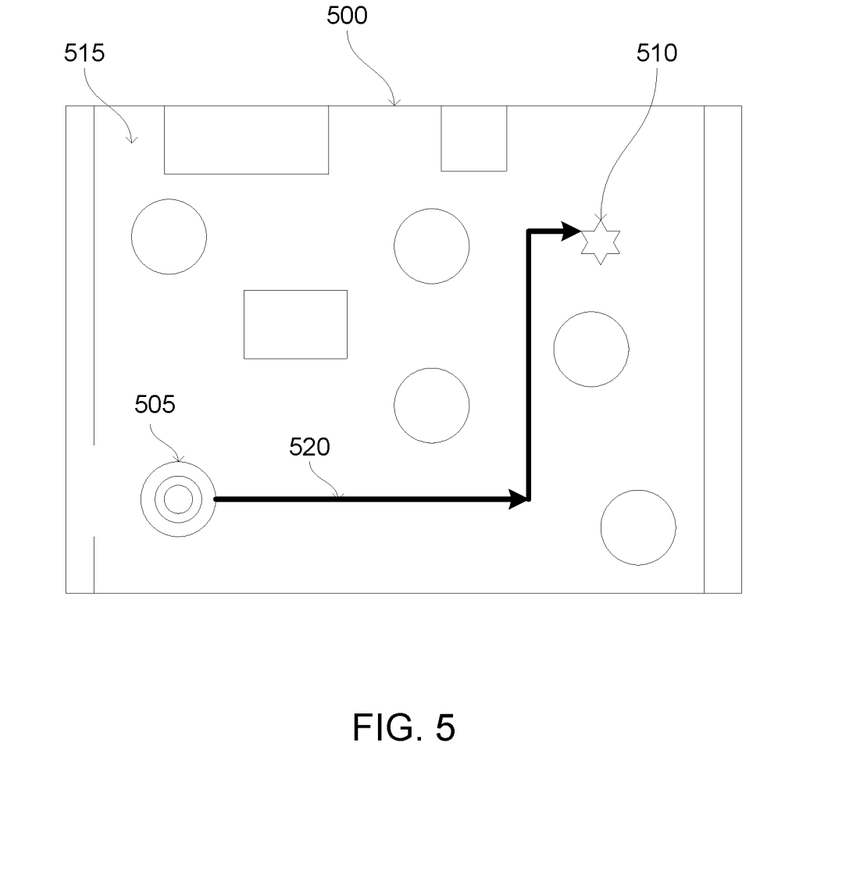
FIG. 5 is an example interface including directions from a physical location of a client device associated with a user to a physical location of a meeting point associated with a venue, in accordance with an embodiment.

FIG. 5 is an example interface 500 transmitted by the online system 250 to a client device 210A associated with a user who selected an additional user. In the example of FIG. 5, the interface 500 includes a representation 505 of the physical location of the client device 210A and a representation 510 of the physical location of the meeting point overlaid on a map 515 of a portion of the venue 100 including the physical locations of the client device 210A and of the meeting point. The map 515 includes representations of structures or objects in the venue 100, and may also include representations of other users in the portion of the venue 100 based on physical locations of client devices 210 associated with the other users received by the online system 250. The interface 500 also includes a path 520 corresponding to the directions from the physical location of the client device 210A to the physical location of meeting point determined by the online system 250. While the path 520 in FIG. 5 is a graphical connection between the physical location of the client device 210A to the physical location of the meeting point shaped based on the determined directions, in other embodiments, the interface 500 may present a textual representation of the determined directions or any other suitable representation of the directions. While FIG. 5 shows an example interface 500 transmitted to a client device 210A associated with the user, a similar interface is transmitted to an additional client device 210A associated with an additional user selected by the user that includes a physical location of the additional client device 210B, a physical location of the meeting point, and directions from the physical location of the additional client device 210B to the physical location of the meeting point determined by the online system 250.

Referring again to FIG. 4, if the online system 250 identifies a change in the physical location of the client device 210A associated with the user or in the physical location of the additional client device 210B associated with the selected additional user, the online system 250 determines modified directions from the changed physical location of the client device 210A or from the changed physical location of the additional client device 210B to the physical location of the meeting point. The online system 250 transmits 450 modifications to the interface or a modified interface including the modified directions or transmits 455 modifications to the interface or a modified interface including the modified directions to the additional client device 210B. For example, the online system 250 generates modified directions when the physical location of the client device 210A changes more than a threshold amount and transmits 450 a modified interface including the modified directions to the client device 210A. Similarly, the online system 250 may generate modified directions when the physical location of the additional client device 210B changes more than the threshold amount and transmit 455 a modified interface including the modified directions to the additional client device 210B. In some embodiments, the client device 210A or the additional client device 210B communicates its physical location to the online system 250 at periodic intervals, and the online system 250 identifies a change in the physical location of the client device 210 if a physical location of the client device 210A or of the additional client device 210A received in an interval differs at least a threshold distance from a physical location of the client device 210A or of the additional client device 210B, respectively, received in a preceding interval. Alternatively, the client device 210A or the additional client device 210B communicates a changed physical location to the online system 250 if the application executing on the client device 210A or on the additional client device 210B, respectively, and the online system 250 determines a threshold distance from a physical location of the client device 210A or of the additional client device 210B, respectively, at a current time to the physical location of the client device 210A or of the additional client device 210B at a time when the client device 210A or when the additional client device 210B, respectively, received the interface. Hence, as the physical location of the client device 210A or of the additional client device 210B changes, the interface transmitted 450, 455 to the client device 210A or to the additional client device 210B is modified to account for the changed physical location of the client device 210A or of the additional client device 210B and to present modified directions that allow the user or the selected additional user, respectively, to navigate to the physical location of the meeting point.

In various embodiments, the interface transmitted 450 to the client device 210A or transmitted 455 to the additional client device 210B includes instructions that when, executed by a processor included in the additional client device 210A or in the additional client device 210B, prompt the user or the selected additional user, respectively, to move in particular directions. For example, the instructions included in the interface cause the additional client device 210A or the additional client device 210B provide a visual or audible prompt identifying how the user or the additional user, respectively, is to move to follow the directions when certain criteria are satisfied. As an example, the instructions included in the interface cause the client device 210A to play an audio prompt to the user that recites a portion of the directions when the physical location of the client device 210A is within a threshold distance of a physical location within the venue 100 where the directions identify a change in direction of travel (e.g., an audio prompt telling the delivery person to turn left at a particular physical location); a similar audio prompt may be recited by the additional client device 210B in similar circumstances if the interface transmitted 455 to the additional client device 210B includes the instructions described in the preceding example. Similarly, the instructions may cause the display device 212 of the additional client device 210B to more prominently identify a change in direction of travel to the selected additional user when the physical location of the additional client device 210B is within a threshold distance of the physical location within the venue 100 where the directions identify a change in direction of travel of the selected additional user; similar instructions may be included in the interface transmitted 450 to the client device 210A to more prominently identify a change in direction of travel to the user when specific criteria are satisfied. Including the instructions in the interface transmitted 450 to the client device 210 or in the interface transmitted 455 to the additional client device 210B allows the client device 210 or the additional client device 210B, respectively, to more effectively direct the user and the selected additional user, respectively, to the physical location of the meeting point, reducing a time for the user or for the selected additional user to reach the physical location of the meeting point.

While FIG. 4 describes certain steps as performed by the online system 250, in some embodiments, the application executing on the client device 210A and associated with the online system 250 may perform one or more of the steps identified as performed by the online system 250 in some embodiments. For example, the application executing on the client device 210A determines 445 the directions from the physical location of the client device 210A to the physical location of the meeting point. Similarly, the application executing on the additional client device 210B may determine 445 the directions from the physical location of the additional client device 210B to the physical location of the meeting point in some embodiments. An application executing on the client device 210A or on the additional client device 210B may obtain information about conditions in the venue 100 from the online system 250 and use the information from the online system 250 to locally determine 445 directions from the physical location of the client device 210A to the physical location of the meeting point or to locally determine 445 directions from the physical location of the additional client device 210B to the physical location of the meeting point in some embodiments.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
  receiving information at an online system associated with a venue from a client device associated with a user of the online system, the venue comprising a geographic location associated with one or more structures and the information identifying an additional user selected from information maintained by the client device and a physical location of a meeting point within a threshold distance of a physical location of the venue;
  determining that the online system maintains a user profile for selected additional user and that an additional client device associated with the selected additional user is executing an application associated with the online system;
  determining that a physical location of the additional client device associated with the selected additional user is within the threshold distance of the physical location of the venue;
  responsive to determining that (1) the online system maintains the user profile for selected additional user, (2) that the application associated with the online system is executing on an additional client device associated with the selected additional user, and (3) that the physical location of the additional client device associated with the selected additional user is within the threshold distance of the physical location of the venue, transmitting a request including the physical location of the meeting point from the online system to the additional client device associated with the selected additional user;
  receiving, at the online system, an acceptance of the request from the additional client device associated with the selected additional user;
  determining, by the online system, directions from a physical location of the client device associated with the user of the online system obtained by the online system within a threshold amount of time of the online system beginning to determine the directions to the physical location of the meeting point in response to the online system receiving the acceptance of the request from the additional client device associated with the selected additional user; and
  transmitting an interface to the client device associated with the user of the online system for presentation, the interface including the physical location of the client device associated with the user of the online system and the directions from the physical location of the client device associated with the user of the online system to the physical location of the meeting point.

2. The method of claim 1, wherein the interface further includes an estimated time for the user of the online system to travel from the physical location of the client device associated with the user to the physical location of the meeting point, the estimated time determined by the online system accounting for numbers of users in portions of the venue along a path from the physical location of the client device associated with the user to the physical location of the meeting point based on physical locations of client devices associated with other users obtained by the online system.

3. The method of claim 1, further comprising:
determining modified directions to the physical location of the meeting point in response to a change in the physical location of the client device associated with the user of the online system; and
modifying the interface to include the modified directions and the changed physical location of the client device associated with the user of the online system; and
transmitting the modified interface to the client device associated with the user of the online system.

4. The method of claim 3, wherein modifying the interface comprises:
determining an estimated time for the user of the online system to travel from the changed physical location of the client device associated with the user of the online system to the physical location of the meeting point, the estimated time determined by the online system accounting for numbers of users in portions of the venue along a path from the changed physical location of the client device associated with the user to the physical location of the meeting point based on physical locations of client devices associated with other users obtained by the online system; and
including the estimated time in the interface.

5. The method of claim 1, further comprising:
determining directions from the physical location of the additional client device associated with the selected additional user to the physical location of the meeting point; and
transmitting an additional interface to the additional client device associated with the selected additional user for presentation, the additional interface including the physical location of the additional client device associated with the selected additional user and the directions from the physical location of the additional client device to the physical location of the meeting point.

6. The method of claim 5, further comprising:
determining modified directions from the physical location of the additional client device to the physical location of the meeting point in response to a change in the physical location of the additional client device; and
modifying the additional interface to include the modified directions from the physical location of the additional client device to the physical location of the meeting point and the changed physical location of the additional client device; and
transmitting the modified additional interface to the additional client device.

7. The method of claim 1, wherein the threshold distance of the physical location of the venue is retrieved from a user profile maintained by the online system for the user.

8. The method of claim 1, wherein the threshold distance of the physical location of the venue is determined by the online system based on information describing conditions proximate to the venue.

9. A computer program product having instructions encoded thereon that, when executed by a processor, cause the processor to:
receive information at an online system associated with a venue from a client device associated with a user of the online system, the venue comprising a geographic location associated with one or more structures and the information identifying an additional user selected from information maintained by the client device and a physical location of a meeting point within a threshold distance of a physical location of the venue;
determine that the online system maintains a user profile for selected additional user and that an additional client device associated with the selected additional user is executing an application associated with the online system;
determine that a physical location of the additional client device associated with the selected additional user is within the threshold distance of the physical location of the venue;
responsive to determining that (1) the online system maintains the user profile for selected additional user, (2) that the application associated with the online system is executing on an additional client device associated with the selected additional user, and (3) that the physical location of the additional client device associated with the selected additional user is within the threshold distance of the physical location of the venue, transmit a request including the physical location of the meeting point from the online system to the additional client device associated with the selected additional user;
receive, at the online system, an acceptance of the request from the additional client device associated with the selected additional user;
determine, by the online system, directions from a physical location of the client device associated with the user of the online system obtained by the online system within a threshold amount of time of the online system beginning to determine the directions to the physical location of the meeting point in response to the online system receiving the acceptance of the request from the additional client device associated with the selected additional user; and
transmit an interface to the client device associated with the user of the online system for presentation, the interface including the physical location of the client device associated with the user of the online system and the directions from the physical location of the client device associated with the user of the online system to the physical location of the meeting point.

10. The computer program product of claim 9, wherein the interface further includes an estimated time for the user to travel from the physical location of the client device associated with the user to the physical location of the meeting point, the estimated time determined by the online system accounting for numbers of users in portions of the venue along a path from the physical location of the client device associated with the user to the physical location of the meeting point based on physical locations of client devices associated with other users obtained by the online system.

11. The computer program product of claim 9, wherein the computer readable medium further has instructions encoded thereon that, when executed by the processor, cause the processor to:
determine modified directions to the physical location of the meeting point in response to a change in the physical location of the client device associated with the user of the online system; and modify the interface to include the modified directions and the changed physical location of the client device associated with the user of the online system; and transmit the modified interface to the client device associated with the user of the online system.

12. The computer program product of claim 11, wherein modifying the interface comprises:

determine an estimated time for the user to travel from the changed physical location of the client device associated with the user of the online system to the physical location of the meeting point, the estimated time determined by the online system accounting for numbers of users in portions of the venue along a path from the changed physical location of the client device associated with the user to the physical location of the meeting point based on physical locations of client devices associated with other users obtained by the online system; and include the estimated time in the interface.

13. The computer program product of claim 9, wherein the computer readable medium further has instructions encoded thereon that, when executed by the processor, cause the processor to:

determine directions from the physical location of the additional client device associated with the selected additional user to the physical location of the meeting point; and transmit an additional interface to the additional client device associated with the selected additional user for presentation, the additional interface including the physical location of the additional client device associated with the selected additional user and the directions from the physical location of the additional client device to the physical location of the meeting point.

14. The computer program product of claim 13, wherein the computer readable medium further has instructions encoded thereon that, when executed by the processor, cause the processor to:

determine modified directions from the physical location of the additional client device to the physical location of the meeting point in response to a change in the physical location of the additional client device; and modify the additional interface to include the modified directions from the physical location of the additional client device to the physical location of the meeting point and the changed physical location of the additional client device; and transmit the modified additional interface to the additional client device.

15. The computer program product of claim 9, wherein the threshold distance of the physical location of the venue is retrieved from a user profile maintained by the online system for the user.

16. The computer program product of claim 9, wherein the threshold distance of the physical location of the venue is determined by the online system based on information describing conditions proximate to the venue.

* * * * *